(12) United States Patent
Behmke et al.

(10) Patent No.: US 10,190,363 B2
(45) Date of Patent: Jan. 29, 2019

(54) MULTILAYER FILM WITH ELECTRICALLY SWITCHABLE OPTICAL PROPERTIES

(71) Applicant: Cardinal IG Company, Eden Prairie, MN (US)

(72) Inventors: Michael Behmke, Düsseldorf (DE); Annabelle Andreau-Wiedenmaier, Aachen (DE); Philippe Letocart, Raeren (BE)

(73) Assignee: Cardinal IG Company, Eden Prairie, MN (US)

( * ) Notice: Subject to any disclaimer, the term of this patent is extended or adjusted under 35 U.S.C. 154(b) by 0 days.

(21) Appl. No.: 14/783,772

(22) PCT Filed: Jan. 15, 2014

(86) PCT No.: PCT/EP2014/050685
§ 371 (c)(1),
(2) Date: Oct. 9, 2015

(87) PCT Pub. No.: WO2014/166641
PCT Pub. Date: Oct. 16, 2014

(65) Prior Publication Data
US 2016/0138328 A1    May 19, 2016

(30) Foreign Application Priority Data
Apr. 10, 2013   (EP) .................................... 13163090

(51) Int. Cl.
*G02F 1/161*   (2006.01)
*E06B 9/24*    (2006.01)
(Continued)

(52) U.S. Cl.
CPC ................ *E06B 9/24* (2013.01); *B32B 37/06* (2013.01); *B32B 37/16* (2013.01);
(Continued)

(58) Field of Classification Search
CPC .................................. E06B 9/24; B32B 37/06
See application file for complete search history.

(56) References Cited

U.S. PATENT DOCUMENTS 4,705,360 A * 11/1987 Funada ................. G02F 1/1337
349/123
5,408,353 A    4/1995 Nichols et al.
(Continued)

FOREIGN PATENT DOCUMENTS

| | | |
|---|---|---|
| DE | 102008026339 A1 | 12/2009 |
| EP | 0876608 B1 | 11/1998 |

(Continued)

OTHER PUBLICATIONS

Chen et al., "Electro-Optical Properties of Polymer Stabilized Cholesteric Texture Normal-Mode Light Shutter From Flexible Monomers," ALCOM Tech Report XI, 2000, pp. 223-229.
(Continued)

*Primary Examiner* — Sang V Nguyen
(74) *Attorney, Agent, or Firm* — Fredrikson & Byron, P.A.

(57) ABSTRACT

Multilayer film (1) with electrically switchable optical properties, comprising, arranged sheet-wise in order, at least: —a first carrier film (5), —a first electrically conductive layer (3), —an active layer (2), —a second electrically conductive layer (4) and—a second carrier film (6), wherein—the multilayer film (1) has at least two circumferential separating lines (16), which separate an insulated edge region (18) from the first electrically conductive layer (3) and the second electrically conductive layer (4), —the first carrier film (5) and the second carrier film (6) are welded in at least a part of the insulated edge region (18) to form a sealed region (7), and—the separating lines (16) have a width of 10 μm to 500 μm.

18 Claims, 6 Drawing Sheets

A-A'

Figure 1A:
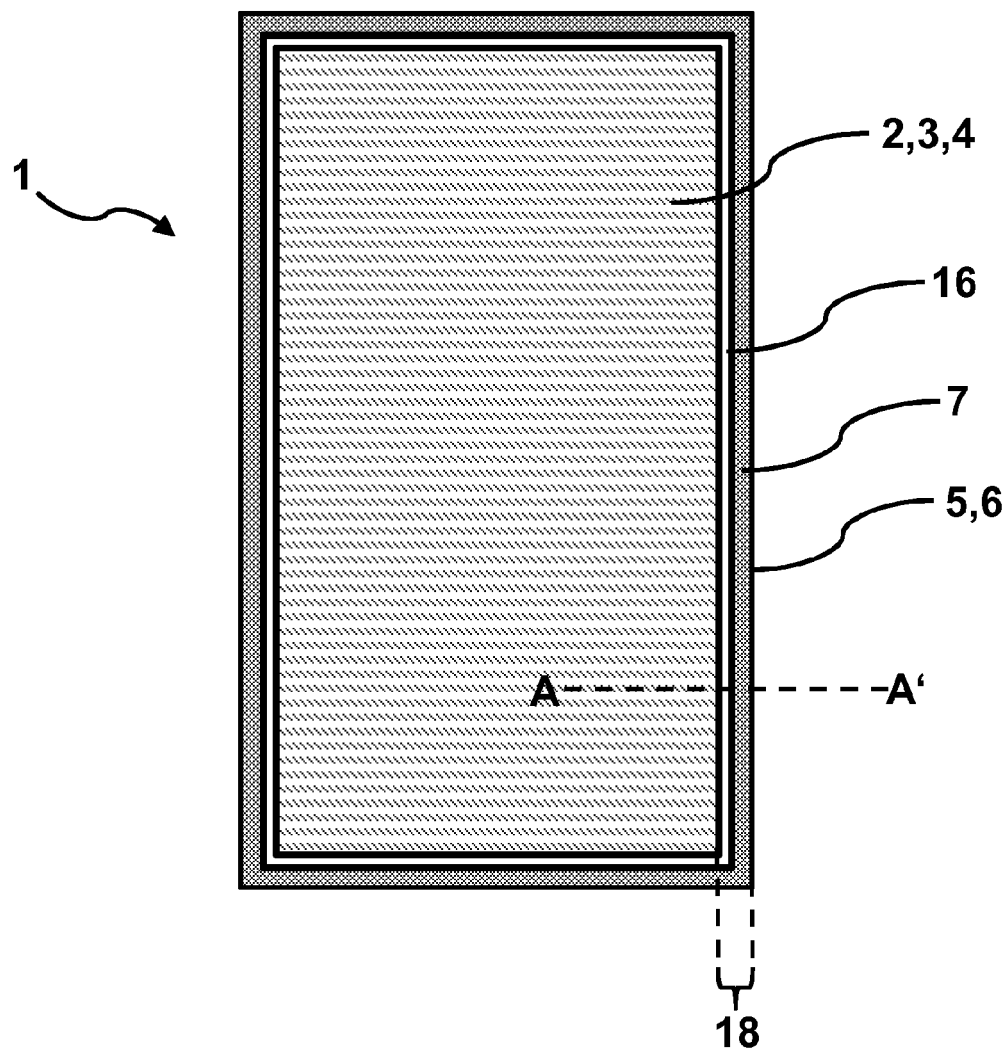

(51) Int. Cl.

| | | |
|---|---|---|
| *G02F 1/01* | (2006.01) | |
| *G02F 1/1334* | (2006.01) | |
| *G02F 1/1339* | (2006.01) | |
| *G02F 1/1343* | (2006.01) | |
| *G02F 1/155* | (2006.01) | |
| *G02F 1/17* | (2006.01) | |
| *B32B 37/06* | (2006.01) | |
| *B32B 37/16* | (2006.01) | |
| *B32B 38/00* | (2006.01) | |
| *G02F 1/1333* | (2006.01) | |

(52) U.S. Cl.
CPC ........ *B32B 38/0004* (2013.01); *G02F 1/0107* (2013.01); *G02F 1/1334* (2013.01); *G02F 1/1339* (2013.01); *G02F 1/1343* (2013.01); *G02F 1/155* (2013.01); *G02F 1/161* (2013.01); *G02F 1/172* (2013.01); *B32B 2307/202* (2013.01); *B32B 2307/422* (2013.01); *B32B 2310/0843* (2013.01); *B32B 2551/00* (2013.01); *E06B 2009/2464* (2013.01); *G02F 2001/133388* (2013.01)

(56) References Cited

U.S. PATENT DOCUMENTS

| | | | |
|---|---|---|---|
| 5,686,017 A | | 11/1997 | Kobayashi et al. |
| 5,958,290 A | | 9/1999 | Coates et al. |
| 6,271,899 B1 | * | 8/2001 | Lewis .................. G02F 1/1334 |
| | | | 349/198 |
| 6,295,102 B1 | | 9/2001 | Higa et al. |
| 6,373,618 B1 | | 4/2002 | Agrawal et al. |
| 6,429,961 B1 | | 8/2002 | Harary et al. |
| 6,661,486 B1 | | 12/2003 | Faris et al. |
| 6,795,226 B2 | * | 9/2004 | Agrawal ........... B32B 17/10036 |
| | | | 359/254 |
| 6,867,888 B2 | * | 3/2005 | Sutherland .......... C09K 19/544 |
| | | | 349/201 |
| 7,342,704 B2 | | 3/2008 | Yano |
| 7,525,604 B2 | | 4/2009 | Xue |
| 7,755,829 B2 | | 7/2010 | Powers et al. |
| 7,837,897 B2 | | 11/2010 | Zhang et al. |
| 8,102,478 B2 | | 1/2012 | Xue |
| 8,187,682 B2 | | 5/2012 | Albrecht et al. |
| 8,514,476 B2 | | 8/2013 | Egerton et al. |
| 8,749,870 B2 | | 6/2014 | Egerton et al. |
| 8,941,788 B2 | | 1/2015 | Brecht et al. |
| 9,110,345 B2 | | 8/2015 | Egerton et al. |
| 2001/0033400 A1 | | 10/2001 | Sutherland et al. |
| 2002/0118335 A1 | * | 8/2002 | Tannas, Jr. ............ G02F 1/1339 |
| | | | 349/187 |
| 2003/0193709 A1 | * | 10/2003 | Mallya .................. G02F 1/1334 |
| | | | 359/245 |
| 2004/0227462 A1 | | 11/2004 | Utsumi et al. |
| 2005/0179852 A1 | * | 8/2005 | Kawai .............. G02F 1/133305 |
| | | | 349/153 |
| 2009/0015902 A1 | * | 1/2009 | Powers .................... E06B 9/24 |
| | | | 359/288 |
| 2009/0068455 A1 | | 3/2009 | Albrecht et al. |
| 2009/0103027 A1 | | 4/2009 | Hughes et al. |
| 2009/0219603 A1 | | 9/2009 | Xue |
| 2009/0290078 A1 | | 11/2009 | Yang et al. |
| 2009/0323160 A1 | * | 12/2009 | Egerton .................. G02F 1/153 |
| | | | 359/275 |
| 2010/0045924 A1 | * | 2/2010 | Powers ...................... G02B 5/23 |
| | | | 349/190 |
| 2010/0118380 A1 | | 5/2010 | Xue |
| 2010/0158772 A1 | * | 6/2010 | Gerdts ...................... B01D 9/00 |
| | | | 422/245.1 |
| 2010/0221853 A1 | * | 9/2010 | Buchel ................ H01L 51/0015 |
| | | | 438/26 |
| 2010/0279125 A1 | | 11/2010 | Buyuktanir et al. |
| 2010/0294679 A1 | | 11/2010 | Griffiths et al. |
| 2011/0102730 A1 | | 5/2011 | Lee et al. |
| 2011/0234944 A1 | * | 9/2011 | Powers ................ C09K 19/544 |
| | | | 349/86 |
| 2012/0026573 A1 | * | 2/2012 | Collins ............. B32B 17/10055 |
| | | | 359/275 |
| 2013/0093969 A1 | | 4/2013 | Li et al. |
| 2013/0286458 A1 | * | 10/2013 | Lamine .................... G02F 1/155 |
| | | | 359/265 |
| 2014/0118810 A1 | | 5/2014 | Mohat |
| 2014/0141192 A1 | * | 5/2014 | Fernando .............. E06B 3/6775 |
| | | | 428/76 |
| 2014/0176836 A1 | * | 6/2014 | Brecht ............. B32B 17/10036 |
| | | | 349/16 |
| 2014/0176848 A1 | * | 6/2014 | Gupta .................. C03B 33/0222 |
| | | | 349/58 |
| 2015/0177586 A1 | | 6/2015 | Egerton et al. |
| 2015/0211938 A1 | | 8/2015 | Brecht et al. |
| 2015/0298431 A1 | * | 10/2015 | Von Der Weiden ........................ |
| | | | B32B 17/10036 |
| | | | 428/76 |
| 2015/0362818 A1 | | 12/2015 | Greer |
| 2015/0362819 A1 | | 12/2015 | Bjornard et al. |
| 2015/0370140 A1 | | 12/2015 | Bertolini |
| 2016/0293880 A1 | * | 10/2016 | Hakii ......................... C22C 5/04 |

FOREIGN PATENT DOCUMENTS

| | | | |
|---|---|---|---|
| EP | 1862849 A1 | | 12/2007 |
| EP | 2128688 A1 | | 12/2009 |
| JP | 2012030980 A | | 2/2012 |
| JP | 2012037558 A | | 2/2012 |
| JP | WO2014148512 | * | 9/2014 ............ B32B 15/04 |
| WO | 2010112789 A2 | | 10/2010 |
| WO | 2010147494 A1 | | 12/2010 |
| WO | 2011033313 A1 | | 3/2011 |
| WO | 2012007334 A1 | | 1/2012 |

OTHER PUBLICATIONS

"Liquid Crystal Glass," retrieved from http://www.glazette.com/Glass-Knowledge-Bank-70/Liquid-Crystal-Glass.html on Oct. 1, 2013, 2 pages.

"Switchable Intelligent Glass—SGG Priva-lite Electrochromatic Glass," Saint Gobain Glass India, retrieved from http://in.saint-gobain-glass.com/b2c/default.asp?nav1=pr&nav2=single%20pane&id=18978 on Oct. 1, 2013, 1 page.

"Transparent Display," Kent Optronics, retrieved from http://kentoptronics.com/transparent.html on Oct. 1, 2013, 1 page.

* cited by examiner

MULTILAYER FILM WITH ELECTRICALLY SWITCHABLE OPTICAL PROPERTIES

CROSS-REFERENCE

This application is a 35 U.S.C. 371 national stage filing from International Application No. PCT/EP2014/050685, filed Jan. 15, 2014 and claims priority to European Application No. 13163090.7 filed Apr. 10, 2013. The entire contents of these applications are incorporated herein by reference.

The invention relates to a multilayer film with electrically switchable optical properties, a method for its production, and its use.

Glazings with electrically switchable optical properties are known. Such glazings include a functional element, which typically includes an active layer between two surface electrodes. The optical properties of the active layer can be modified by a voltage applied to the surface electrodes. Electrochromic functional elements, known, for example, from US 20120026573 A1 and WO 2012007334 A1, are an example of this. SPD (suspended particle device) functional elements, known, for example, from EP 0876608 B1 and WO 2011033313 A1, are another example. The transmission of visible light through electrochromic or SPD functional elements can be controlled by the voltage applied. Glazings with such functional elements can thus be conveniently darkened electrically.

Electrically switchable functional elements are frequently provided as multilayer films. The actual functional element is arranged between two polymeric carrier films. Such multilayer films enable simplified production of an electrically switchable glazing. Typically, the multilayer film is laminated between two glass panes using conventional methods, producing a composite pane with electrically switchable optical properties. In particular, the multilayer films can be purchased commercially such that the glazing manufacturer itself does not have to produce the switchable functional element per se.

JP 2012037558 discloses a multilayer film containing two transparent conducting layers and an active layer. The multilayer film is mounted between two transparent bodies. The active layer is situated between the two conductive layers. To ensure better stability of this active layer, the open edges of the layer structure are sealed with an adhesive strip, containing butyl rubber and an inorganic material. This forms a diffusion barrier that prevents leakage of the active layer and thus improves the stability of the layer structure. Such sealing, using an adhesive strip, can only be done manually since this process can only be automated with difficulty. Moreover, the adhesive strip must be applied very precisely and crease-free to ensure adequate tightness. Especially in the case of layer structures with visually appealing rounded geometries, as found, for instance, in the architecture sector, crease-free sealing is difficult. Additionally, the adhesive tape must remain stable even during aging and must not exhibit any interaction with other components of the layer structure, which limits the selection of suitable adhesive strips.

US 20050179852 A1 describes an electrically switchable display element with a sealed edge region comprising two polymeric carrier films between which a layer structure is introduced. The layers situated between the carrier films are not applied on the edges to be sealed or are removed therefrom before the sealing of the edge region. Such masking of the edge region or ablation of the layers is, however, expensive.

US 20120026573 A1 discloses an electrochromic functional element comprising an electrochromic layer structure between two glass substrates. Defective areas that result in visible flaws in the electrochromic element are insulated by laser cuts. Partial insulation of the edge region is, in fact, described, but only in the region of the electrochromic layer and the second electrode. There is, explicitly, no insulation in the edge in the edge region for the first electrode.

US 20100221853 A1 discloses a method for patterning layer electrodes in OLED displays, by means of which different segments are individually controllable.

The object of the present invention is to make available a multilayer film with electrically switchable optical properties, which has an improved edge seal, as well as an economical method for its production. The method should enable automated edge processing of the multilayer film, thus avoiding the disadvantages of the prior art.

The object of the present invention is accomplished according to the invention by a multilayer film with electrically switchable optical properties, a method for its production, and its use according to the independent claims 1, 9, and 15. Preferred embodiments of the invention emerge from the subclaims.

The multilayer film according to the invention with electrically switchable optical properties comprises, arranged sheet-wise in order, at least:
a first carrier film,
a first electrically conductive layer,
an active layer,
a second electrically conductive layer, and
a second carrier film,
wherein
the multilayer film has at least two circumferential separating lines, which separate an insulated edge region from the first electrically conductive layer and the second electrically conductive layer, and
the first carrier film and the second carrier film are welded in at least one part of the insulated edge region to form a sealed region, and
the width of the circumferential separating lines is 10 µm to 500 µm.

The edge region is completely insulated electrically by the introduction of separating lines in both electrically conductive layers, which is of critical significance to avoid short circuits at the time of subsequent welding of the carrier films. The introduction of separating lines of low width in the range from 10 µm to 500 µm is, moreover, advantageous compared to a large area ablation of the layers in the edge region.

The multilayer film is a layer stack, wherein the layers of the layer stack comprise at least a first carrier film, a first electrically conductive layer, an active layer, a second electrically conductive layer, and a second carrier film, which are arranged sheet-wise one over another in this order. The first carrier film is the carrier film adjacent the first electrically conductive layer. The second carrier film is the carrier film adjacent the second electrically conductive layer.

In the context of the invention, "a multilayer film with electrically switchable optical properties" designates not only a multilayer film whose optical properties, for example, the transmission of visible light, can be switched between two discrete states, for example, an opaque and a transparent state. It is also understood to mean those multilayer films whose optical properties are continuously variable.

The edge region of the multilayer film is sealed according to the invention directly by the carrier films without other materials, for instance, an adhesive strip, having to be added for sealing. Moreover, the carrier films are durably and stably bonded to each other by welding. In contrast, the adhesive strips known according to the prior art frequently exhibit, with aging, a failure of adhesion, by which means the diffusion of foreign substances into the active layer as well as leakage of the active layer are enabled. The creation of a sealed edge region by welding of the carrier films is, moreover, possible regardless of the geometric shape of the multilayer film. Thus, the multilayer film according to the invention is sealable without defects even in the case of complex geometries, for example, round shapes. Furthermore, the sealed region according to the invention is visually inconspicuous compared to the solutions known in the prior art.

The actual functional element with electrically switchable optical properties is formed by the two electrically conductive layers and the active layer. The electrically conductive layers form surface electrodes. By applying a voltage to the surface electrodes, or by changing the voltage being applied to the surface electrodes, the optical properties of the active layer, in particular the transmission and/or control of visible light, can be influenced.

In the multilayer film according to the invention, the actual functional element is arranged between at least two carrier films. Such a multilayer film is, in particular, provided for the purpose of being bonded to at least one pane to form a glazing with electrically switchable optical properties. The advantage of a multilayer film with electrically switchable optical properties resides in simple production of the glazing. The actual functional element is advantageously protected by the carrier films against damage, in particular, corrosion, and can be prepared before the production of the glazing even in large quantities, which can be desirable from an economic and process technology standpoint. If the glazing is a composite pane, the multilayer film can simply be placed, during production, in the composite, which is then laminated using conventional methods to form the composite pane.

In the context of the invention, a separating line is understood to be a linear region within the electrically conductive layer, which linear region is not electrically conductive and which extends over the entire thickness of the electrically conductive layer. According to the invention, the separating lines are introduced into the electrically conductive layers by means of a first laser and created by means of laser-induced degeneration within the electrically conductive layers. Such a laser-induced degeneration is, for example, the ablation of the electrically conductive layer or a chemical modification of the electrically conductive layer. By means of the laser-induced degeneration, an interruption of the electrical conductivity of the layer is achieved. Preferably, a pulsed solid-state laser is used as the first laser.

The circumferential separating lines isolate an insulated edge region from the conductive layers, to which the region is no longer electrically conductively connected. At least one separating line is introduced into each electrically conductive layer, with the separating lines preferably placed mutually congruent. The region between the separating line nearest the outer edge and the outer edge of the multilayer film forms the insulated edge region. Since the edge region is electrically insulated in this manner, the first carrier film and the second carrier film can be welded, without causing a short circuit.

The width of the circumferential separating lines is preferably 30 µm to 500 µm, preferably 100 µm to 300 µm. Particularly good results are obtained in this line width range. On the one hand, the separating lines are wide enough to result in an effective interruption of the electrically conductive layer. On the other, the line width is advantageously small so as to be hardly visible to an observer. Separating lines with these small line widths are difficult if not impossible to produce with mechanical machining methods. In the method according to the invention, the line width can be adjusted, in particular by expansion of the focus of the laser radiation as well as by the power of the laser radiation. Alternatively, there can also be complete decoating or degeneration of the electrically conductive layers in the insulated edge region. A thinner separating line within the range indicated as preferable is, however, completely adequate and can be introduced into the electrically conductive layers by simple means using a laser.

In an advantageous embodiment, the circumferential separating lines are introduced into the electrically conductive layer through the respective adjacent carrier film. The circumferential separating lines are, in that case, introduced into the first electrically conductive layer and the second electrically conductive layer by means of a first laser through the first carrier film and/or the second carrier film. In the context of the invention, "the adjacent carrier film" is understood to mean that carrier film that is arranged on the side of that electrically conductive layer in which the separating line is introduced that is turned away from the active layer. The electrically conductive layer with the separating line is thus arranged between the carrier film and the active layer. A first laser is first focused through the first carrier film onto the first electrically conductive layer, and a circumferential separating line is introduced therein. Then, the first laser is focused through the second carrier film onto the second electrically conductive layer, and a circumferential separating line is introduced into the second electrically conductive layer. However, it is also possible to introduce the separating line into the electrically conductive layer through the nonadjacent carrier film (and through the other electrically conductive layer as well as the active layer). However, due to the higher energy input necessary, with a high level of absorption of the active layer relative to wavelengths of the first laser, blistering in the film composite is possible. With the generally common low layer thicknesses of the active layer, the absorption of the active layer is, however, adequately low such that the first laser can be focused through the first carrier film or the second carrier film onto both electrically conductive layers. Thus, in general, a single first laser that can be mounted stationarily and always shines in onto the multilayer composite from the same side suffices. If such a procedure is not possible due to the layer thickness and the nature of the active layer, either a single movable first laser can be used or two first lasers are used, with one laser focused in each case through one of the carrier films onto the respective adjacent electrically conductive layer.

If multiple congruent separating lines are to be created in the two electrically conductive layers, the separating lines of the two electrically conductive layers can be introduced in temporal succession. A particular advantage of the method according to the invention is that the separating lines can be introduced into the electrically conductive layers with the necessary high precision and reproducibility. If the method according to the invention is used on a multilayer film with a suitable active layer, in particular with an active layer with an adequately low level of absorption relative to the wavelength of the laser radiation of the first laser, it is alternatively possible for both electrically conductive layers to be targeted by the focus of the laser radiation and for the separating lines to even be introduced at the same time.

In a possible embodiment, the active layer is degraded in the region of the separating lines and/or of the insulated edge region by processing with the first laser. In general, however, this step is unnecessary since the welding of the carrier films is possible even without prior processing of the active layer.

The carrier films are welded in the insulated edge region by heating the first carrier film and/or the second carrier film by means of a second laser to form a sealed region. Preferably, the first and the second carrier film are heated as uniformly as possible by means of a continuous laser line and thus welded to each other to form a sealed region. The maximum size of the sealed region is that of the insulated edge region. A high-power diode laser is particularly preferably used as the second laser.

In an alternative embodiment, the carrier films are welded to each other by heated rollers. At least a part of the insulated edge region runs through a pair of rollers heated to the melting temperature of the material of the carrier films. The heated rollers press the carrier films together in this region and, in the process, weld them to form a sealed region.

The welding of the carrier films in the insulated edge region is also possible by means of other methods known to the person skilled in the art.

The width of the sealed region is 500 μm to 1 cm, preferably 1 mm to 5 mm. The small size of the sealed region is particularly advantageous, since it is not visually noticeable even with use of the multilayer film in frameless glazing modules. Furthermore, the sealed edge region according to the invention is transparent, in contrast to the adhesive strip used according to the prior art.

In a possible embodiment of the invention, in addition to the separating lines, one or a plurality of patterning lines are introduced into the first electrically conductive layer and/or the second electrically conductive layer. These patterning lines are not electrically conductive and extend over the entire thickness of the electrically conductive layer. The patterning lines can also be introduced into the electrically conductive layers by means of the first laser and are created by laser-induced degeneration within the electrically conductive layers. Such laser-induced degeneration is, for example, the ablation of the electrically conductive layer or a chemical change of the electrically conductive layer. By means of the laser-induced degeneration, an interruption of the electrical conductivity of the layer is achieved. The patterning lines serve to create multiple regions of the multilayer film switchable independently of one another.

The carrier films preferably contain at least one thermoplastic polymer, particularly preferably polyethylene terephthalate (PET). That is particularly advantageous with regard to the stability of the multilayer film. However, the carrier films can also contain, for example, polyethylene naphthalate, polyethylene terephthalate, polyethylene, polycarbonate, polymethyl methacrylate, polyacrylate, polyvinyl chloride, polyacetal resin, acrylates, fluorinated ethylene propylenes, polyvinyl fluoride, ethylene tetrafluoroethylene, and/or mixtures and/or copolymers thereof. The thickness of each carrier film is preferably from 0.1 mm to 1 mm, particularly preferably from 0.1 mm to 0.2 mm. On the one hand, by means of carrier films with such a low thickness, a low thickness of the glazing in which the multilayer film is to be used is obtained. On the other, effective protection of the active layer and of the electrically conductive layers is ensured.

The electrically conductive layers are preferably transparent. The electrically conductive layers preferably contain at least a metal, a metal alloy, or a transparent conducting oxide (TCO). The electrically conductive layers preferably contain at least a transparent conducting oxide. It has been demonstrated that electrically conductive layers made of a transparent conducting oxide are particularly well-suited for the laser processing according to the invention. The electrically conductive layers particularly preferably contain at least indium tin oxide (ITO).

However, the electrically conductive layers can also contain, for example, silver, gold, copper, nickel, chromium, tungsten, indium zinc oxide (IZO), cadmium stannate, zinc stannate, gallium-doped or aluminum-doped zinc oxide, or fluorine-doped or antimony-doped tin oxide.

The electrically conductive layers preferably have a thickness of 10 nm to 2 μm, particularly preferably of 20 nm to 1 μm, quite particularly preferably of 30 nm to 500 nm, and in particular of 50 nm to 200 nm. Thus, an advantageous electrical contacting of the active layer and an effective introduction of the separating lines according to the invention are achieved.

The electrically conductive layers are provided to be electrically connected to at least one external voltage source in a manner known per se, to serve as surface electrodes of the switchable functional element. The electrical connection is done via suitable connection cables, for example, foil conductors, which are optionally connected by so-called bus bars, for example, strips of an electrically conductive material or electrically conductive prints to which the electrically conductive layers are connected. The mounting of the connection cable on the electrically conductive layers can occur before or after the introduction of the separating lines according to the invention, for example, by soldering, gluing, or embedding in the multilayer film.

The actual switchable functional element of the multilayer film according to the invention can, in principle, be any functional element with electrically switchable optical properties known per se to the person skilled in the art. The design of the active layer is guided by the type of the functional element.

In an advantageous embodiment of the invention, the multilayer film is an electrochromic functional element. The active layer of the multilayer film is an electrochemically active layer. The transmission of visible light depends on the degree of storage of ions in the active layer, with the ions provided, for example, by an ion storage layer between an active layer and a surface electrode. The transmission can be regulated by the voltage applied on the surface electrodes, which causes migration of the ions. Suitable active layers contain, for example, at least tungsten oxide or vanadium oxide. Electrochromic functional elements are known, for example, from WO 2012007334 A1, US 20120026573 A1, WO 2010147494 A1, and EP 1862849 A1.

In another advantageous embodiment of the invention, the multilayer film is a PDLC (polymer dispersed liquid crystal) functional element. The active layer contains liquid crystals, which are, for example, embedded in a polymeric matrix. When no voltage is applied to the surface electrodes, the liquid crystals are randomly oriented, which results in strong scattering of the light passing through the active layer. When a voltage is applied to the surface electrodes, the liquid crystals orient themselves in a common direction and the transmission of light through the active layer is increased. Such a functional element is known, for example, from DE 102008026339 A1.

In another advantageous embodiment of the invention, the multilayer film is an electroluminescent functional element. The active layer contains electroluminescent materials, which can be inorganic or organic (OLEDs). By means of application of a voltage to the surface electrodes, the luminescence of the active layer is excited. Such functional elements are known, for example, from US 2004227462 A1 and WO 2010112789 A2.

In another advantageous embodiment of the invention, the multilayer film is an SPD (suspended particle device) functional element. The active layer contains suspended particles, which are preferably stored in a viscous matrix. The absorption of light by the active layer can be varied by application of a voltage to the surface electrodes, which results in a change in orientation of the suspended particles. Such functional elements are known, for example, from EP 0876608 B1 and WO 2011033313 A1.

Besides the active layer, the electrically conductive layers, and carrier films, the multilayer film can, of course, have other layers known per se, for example, a barrier layers, blocker layers, antireflective or reflective layers, protective layers, and/or smoothing layers.

The area of the multilayer film according to the invention can vary widely and can thus be adapted to the requirements in the individual case. The area is, for example, from 100 $cm^2$ to 20 $m^2$. Preferably, the multilayer film has an area from 400 $cm^2$ to 6 $m^2$, as is common for the production of glazings of motor vehicles and of structural and architectural glazings.

According to the invention, the separating lines are introduced into the electrically conductive layers by means of a first laser. The radiation of the first laser passes through a carrier film into the multilayer film. The radiation of the first laser is preferably focused by means of at least one optical element, for example, a lens or an objective lens onto the electrically conductive layer. Particularly suitable are f-theta-lenses or f-theta-objective lenses. These result in the fact that a laser beam is focused with different entry angles into the optical element (f-theta lens) into a plane that lies perpendicular to the central axis of the laser beam.

The focal length of the focusing element determines the spread of the focus of the laser radiation. The focal length of the focusing optical element is preferably from 5 mm to 100 mm, particularly preferably from 10 mm to 40 mm. Particularly good results are obtained with this. A smaller focal length of the optical element requires too little working distance between the electrically conductive layer and the optical element. A larger focal length results in too great a spread of the laser focus, by means of which the resolving capacity of the patterning process and the power density in the focus are restricted.

Between the first laser and the focusing optical element, the radiation of the first laser can be guided by at least one optical waveguide, for example, a glass fiber. Other optical elements can also be arranged in the beam path of the first laser, for example, collimators, screens, filters, or elements for frequency doubling.

The separating lines are introduced into the electrically conductive layer by a movement of the radiation of the first laser relative to the multilayer film. In an advantageous embodiment, the multilayer film is stationary during the introduction of the line and the radiation of the first laser is moved over the electrically conductive layer. The movement of the radiation of the first laser preferably occurs by means of at least one mirror that is connected to a movable component. By means of the movable component, the mirror can be adjusted in two directions, preferably two directions orthogonal to one another, particularly preferably horizontally and vertically. The movement of the radiation of the first laser can also be accomplished by multiple mirrors, connected in each case to a movable component. For example, the movement of the radiation of the first laser can be accomplished by two mirrors, with one mirror horizontally adjustable and the other mirror vertically adjustable.

The welding of the carrier films is accomplished by heating by means of a second laser. A diode laser or a fiber laser, preferably a diode laser, particularly preferably a high-power diode laser operated as a continuous wave laser, can be used as the second laser. The second laser creates a continuous laser line. This has the advantage that in the entire region of the laser line, continuous heat input and area-wise heating occur and particularly uniform processing is thus possible. Furthermore, such processing by means of a high-power diode laser has proven particularly effective and economical.

The radiation of the second laser is guided over the multilayer film by at least one mirror, analogously to the process described for the first laser.

Alternatively, the movement of the radiation of the first and second laser can be accomplished by means of a movement of the focusing element and of the first or the second laser or by movement of the focusing element and of an optical waveguide over the stationary multilayer film. Alternatively, the radiation of the first or the second can be stationary and the multilayer film can be moved.

In a preferred embodiment of the invention, the first carrier film and the second carrier film are pressed together mechanically immediately after their heating by means of the second laser in order to ensure good adhesion of the two carrier films. This is preferably done by two rollers opposing each other, between which the heated regions of the carrier films pass.

The invention further comprises a composite pane with a multilayer film according to the invention in the film composite. The multilayer film is preferably embedded into the intermediate layer of the composite pane. For this, each carrier film is preferably bonded in each case to one pane via a laminating film. The bonding occurs under the action of heat, vacuum, and/or pressure according to methods known per se. The laminating films contain at least one thermoplastic polymer, for example, ethylene vinyl acetate, polyvinyl butyral, polyurethane, and/or mixtures and/or copolymers thereof. The thickness of thermoplastic bonding film is preferably from 0.25 mm to 2 mm, for example, 0.38 mm or 0.76 mm. The panes preferably contain glass, particularly preferably flat glass, float glass, quartz glass, borosilicate glass, soda lime glass, or clear plastics, particularly preferably rigid clear plastics, for example, polycarbonate or polymethyl methacrylate. The panes can be clear and transparent or also tinted or colored. The thickness of the panes can vary widely and thus be adapted to the requirements in the individual case. The thickness of each pane is preferably from 0.5 mm to 15 mm, particularly preferably from 1 mm to 5 mm. The composite pane can have any three-dimensional shape. The composite pane is preferably flat or slightly or greatly curved in one a plurality of spatial directions.

The invention further comprises a method for producing a multilayer film with electrically switchable optical properties comprising the steps a) Preparing a multilayer film,
b) Focusing the radiation of a first laser through the first carrier film and/or the second carrier film onto the first electrically conductive layer and/or the second electrically conductive layer,
c) Guiding the radiation of the first laser over the first electrically conductive layer and/or the second electrically conductive layer and creating at least one circumferential separating line, d) Optionally repeating process steps b) and c) for the first electrically conductive layer or the second electrically conductive layer until the multilayer film has an insulated edge region in all electrically conductive layers, e) Welding the first carrier film and the second carrier film by heating in at least one part of the insulated edge region to form a sealed region.

The multilayer film prepared in step a) of the method according to the invention can be processed either in the non-laminated state or also laminated in a composite glass pane. However, processing in the composite requires high energy input such that, depending on the absorption level of the components, blistering can occur. For this reason, the processing of the multilayer film preferably occurs in the non-laminated state. However, if the components of the laminated composite glass pane have adequately low absorption at the wavelength of the first laser, processing of the already laminated composite glass pane is advantageous. In that case, damage and scratches on the multilayer film that can develop during the processing are completely avoided.

In the case of an active layer with an adequately low level of absorption relative to the wavelength of the laser radiation of the first laser, both electrically conductive layers can be targeted by the focus of the first laser and the separating lines can be introduced at the same time in the first electrically conductive layer and the second electrically conductive layer. In this case, process step d) is eliminated.

Preferably, the first carrier film and the second carrier film are heated by means of the radiation of a second laser and welded to each other. The heated areas of the carrier films run through an opposing pair of rollers made up of a first roller and a second roller, by means of which the heated carrier films are pressed together. In this manner, the adhesion of the carrier films to each other is improved. In addition, at the same time, a cooling of the carrier films takes place by means of the rollers. Due to the comparatively low mass of the carrier films compared to the mass of the rollers, no active cooling of the rollers is required. However, alternatively, cooled rollers can also be used or the carrier films can be cooled by a blower installed above and/or below the carrier films.

In an alternative embodiment of the method, the first carrier film and the second carrier film are heated to the melting temperature of the material of the carrier films and pressed together by a heated pair of rollers and welded to each other in this manner.

The wavelength of the laser radiation of the first laser, with which the separating lines are introduced into the electrically conductive layer must be selected suitably such that the electrically conductive layer has an adequately high absorption of the laser radiation and that the carrier film has an adequately low absorption of the laser radiation. Thus, the separating line is advantageously selectively introduced into the electrically conductive layer without the carrier film being damaged. Here, it must be taken into account that by means of the focusing of the laser radiation, the power density in the electrically conductive layer is significantly greater than in the carrier layer.

The ratio of the absorption of the electrically conductive layer to the absorption of the carrier layer at the wavelength of the laser radiation of the first laser is, in a particularly advantageous embodiment, greater than or equal to 0.5, particularly preferably greater than or equal to 1, very particularly preferably greater than or equal to 1.5 and in particular greater than or equal to 2. Thus, an advantageously selective introduction of the separating lines into the electrically conductive layers is achieved.

In a preferred embodiment of the method, the first electrically conductive layer and the second electrically conductive layer have, at the wavelength of the radiation of the first laser, an absorption greater than or equal to 0.1%, preferably greater than or equal to 0.3%, for example, from 0.3% to 20%. The absorption level of the electrically conductive layer relative to the laser radiation of the first laser is very particularly preferably greater than or equal to 5%, and in particular greater than or equal to 10%. The first carrier film and the second carrier film have, in contrast, at the wavelength of the radiation of the first laser, an absorption less than or equal to 15%, preferably less than or equal to 10%, particularly preferably less than or equal to 7%. The wavelength of the radiation of the first laser is accordingly selected such that the electrically conductive layers have an adequately high absorption for their processing, whereas the carrier films have, at the same wavelength, as low an absorption as possible. Preferably, the ratio of the absorption of the electrically conductive layers to the absorption of the carrier layers at the wavelength of the radiation of the first laser is greater than or equal to 0.5, preferably greater than or equal to 1.

Depending on the layer thickness and the nature of the active layer, the processing using the first laser can be done by a single first laser or by a plurality of first lasers. With the use of a single stationary first laser, the radiation of the first laser is first focused through one of the carrier films onto the adjacent electrically conductive layer and then focused on the other electrically conductive layer through the same carrier film, the processed electrically conductive layer, and the active layer. The layer thickness and nature of the active layer of conventional multilayer films is well-suited for such processing by means of a single stationary first laser such that no damage occurs due to high absorption of the active layer. Preferably, a single stationary first laser is accordingly used, by means of which production costs can be reduced compared to the system with multiple lasers. If, due to the high absorption of the active layer in the wavelength range of the first laser, it is impossible to process both electrically conductive layers from the same side of the multilayer film, two first lasers are preferably used.

It has proved advantageous to select the wavelength of the radiation of the first laser at the time of the creation of the separating lines in the range from 150 nm to 1200 nm, preferably in the range from 200 nm to 500 nm, particularly preferably in the range from 250 nm to 400 nm, whereas the wavelength of the radiation of the second laser at the time welding of the carrier films is from 300 nm to 2500 nm, preferably of 500 nm to 1700 nm, particularly preferably of 800 nm to 1200 nm. It has been demonstrated that this range is particularly suitable for the wavelengths with the use of conventional electrically conductive layers and conventional carrier films. The wavelength range of the first laser is selected such that the separating lines are selectively introduced into the electrically conductive layers. In the wavelength range of the second laser, optimum welding of the carrier films occurs, with both adequate energy for the melting of the films being applied and overheating of the material being prevented.

The radiation of the first laser is moved at a speed of 100 mm/s to 10000 mm/s, preferably of 200 mm/s to 5000 mm/s, very particularly preferably of 300 mm/s to 2000 mm/s; and the radiation of the second laser is moved at a speed of 1 mm/s to 1000 mm/s, preferably of 10 mm/s to 800 mm/s, particularly preferably of 20 mm/s to 500 mm/s. Particularly good results are obtained with this.

Preferably, a solid-state laser is used as the first laser, for example, an Nd:Cr:YAG laser, an Nd:Ce:YAG laser, a Yb:YAG laser, particularly preferably an Nd:YAG laser. The radiation of the first laser can be frequency doubled once or multiple times to generate the desired wavelength. However, other lasers can also be used, for example, fiber lasers, semiconductor lasers, excimer lasers, or gas lasers. The first laser is operated in pulsed mode. This is particularly advantageous with regard to a high power density and an effective introduction of the electrically nonconductive lines. The pulse length is preferably less than or equal to 50 ns and the pulse repetition frequency is preferably 1 kHz to 200 kHz, particularly preferably 10 kHz to 100 kHz, for example, 30 kHz to 60 kHz. In test series, the use of Nd:YAG lasers with a wavelength of 355 nm (UV laser) and of Nd:YAG lasers with the wavelength of 532 nm (green laser) has proved advantageous. In particular, the UV laser exhibits a very advantageous ratio of the absorption of the electrically conductive layer to the absorption of the carrier layer of 2.2 at the wavelength of the laser radiation of the first laser.

The second laser is a continuous wave laser, preferably a diode laser or fiber laser, particularly preferably a high-power diode laser.

The output power of the radiation of the first laser is preferably from 0.1 W to 50 W, for example, from 0.3 W to 10 W. The necessary output power is, in particular, dependent on the wavelength of the laser radiation used as well as the level of absorption of the electrically conductive layers and of the carrier films and can be determined by the person skilled in the art through simple experiments. It has been demonstrated that the power of the laser radiation of the first laser affects the line width of the separating line, with a higher power resulting in a greater line width.

The multilayer film according to the invention with electrically switchable optical properties is preferably used in glazings, in particular in composite panes, in buildings, in particular in the entrance area or window area, or in means of transportation for travel on land, in the air, or on water, in particular in trains, ships, aircraft, and motor vehicles, for example, as a rear window, side window, and/or roof panel.

Figure 1B:
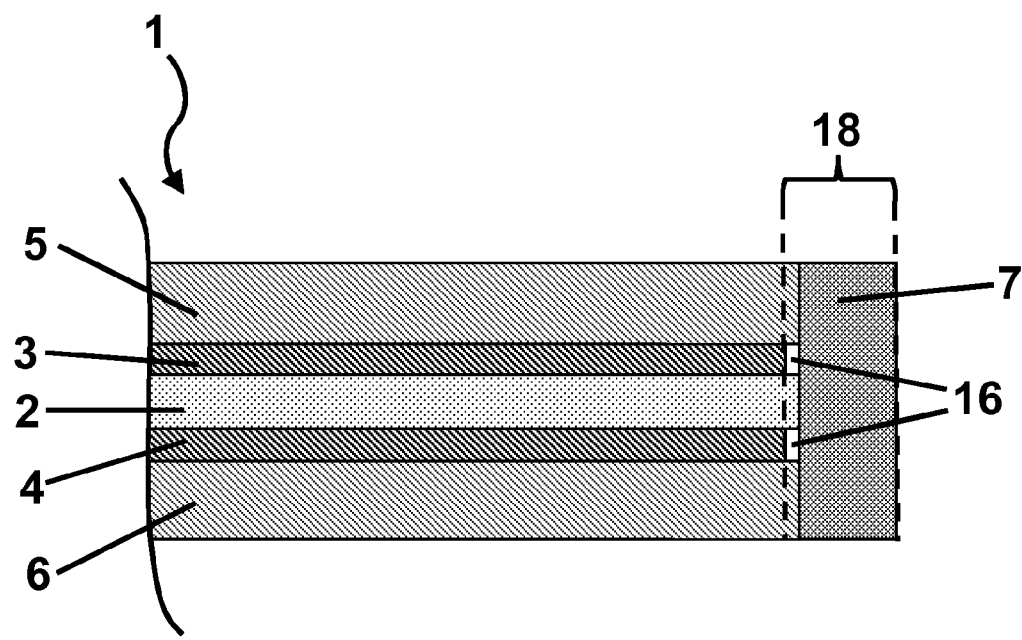
Figure 3:
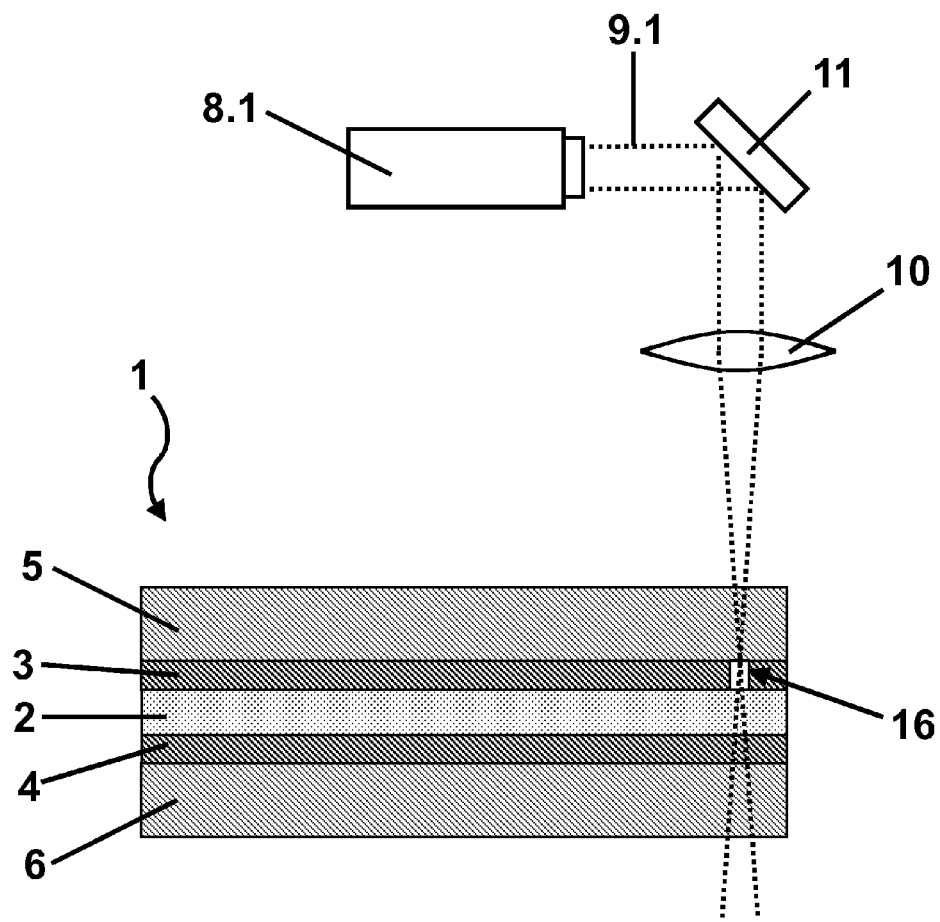
Figure 4:
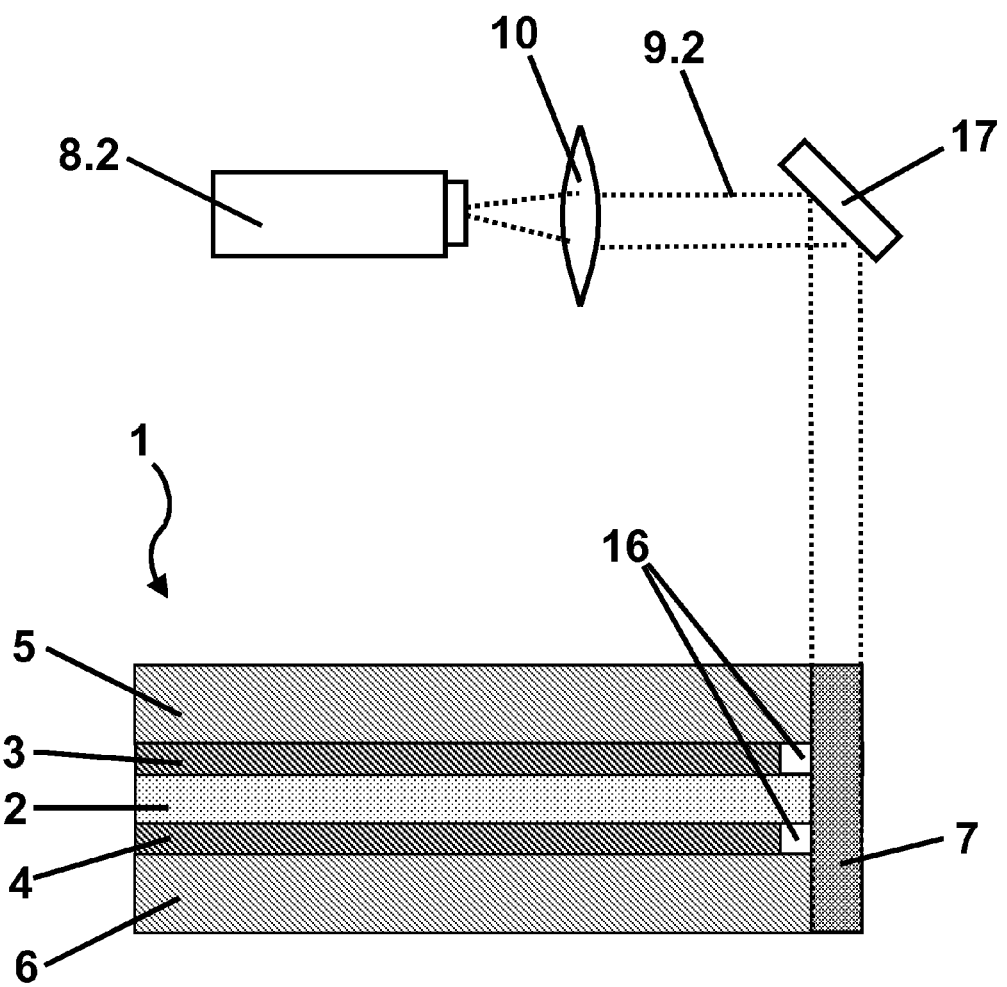
Figure 5:
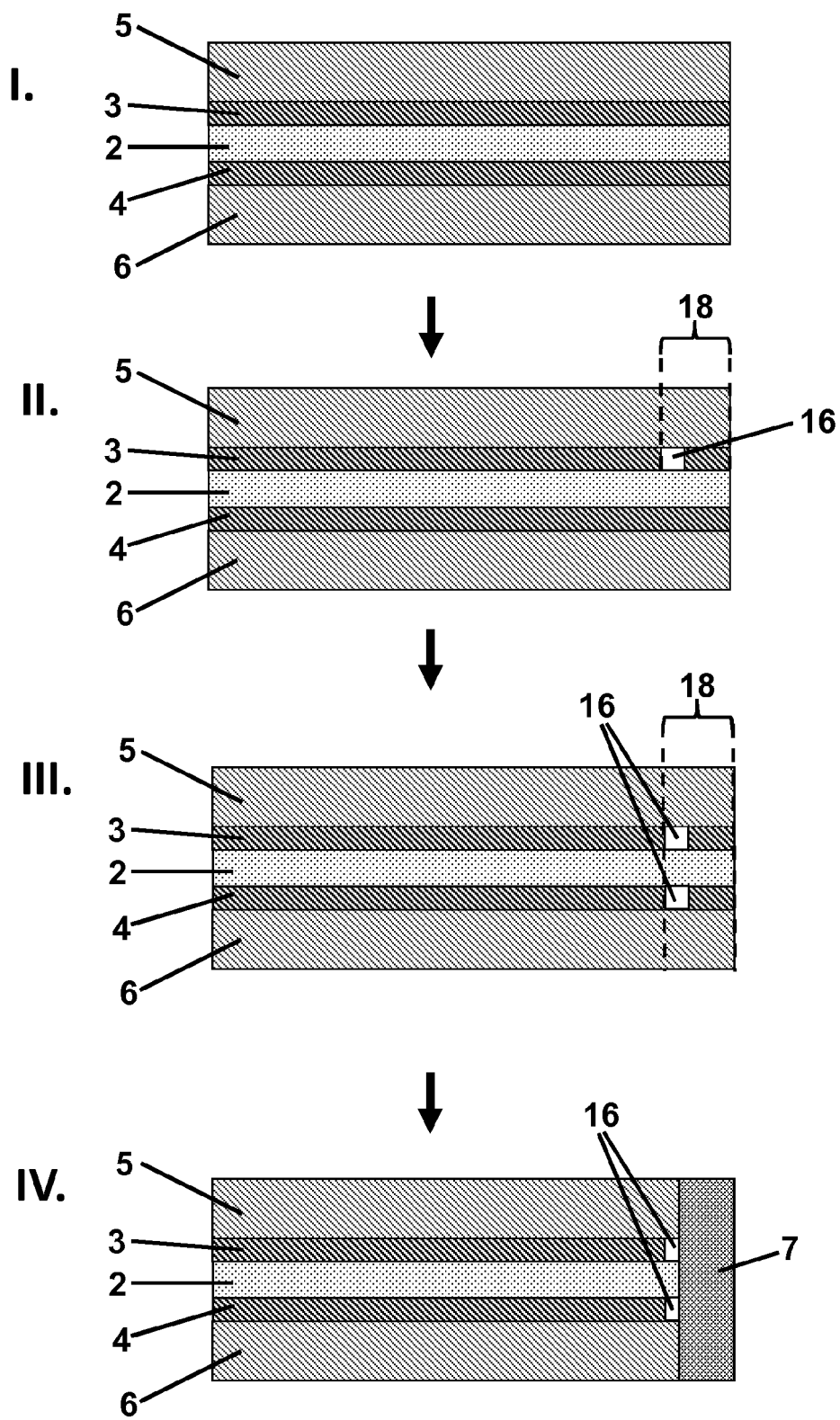
Figure 6:
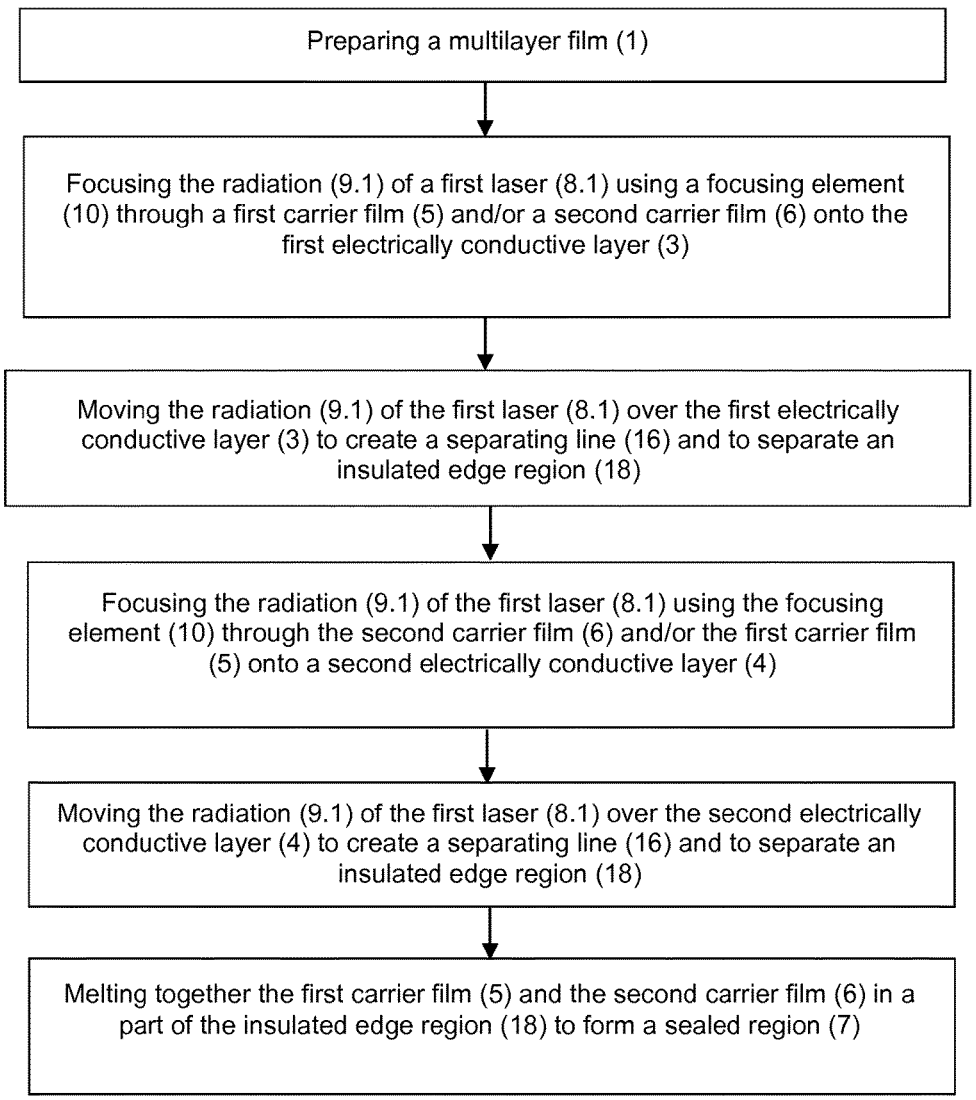

The invention is explained in detail in the following with reference to drawings. The drawings are schematic representations and not true to scale. The drawings in no way restrict the invention. They depict:

FIG. 1a a plan view of a first embodiment of the multilayer film according to the invention with electrically switchable optical properties, FIG. 1b a cross-section along the section line A-A' through the multilayer film of FIG. 1a, FIG. 2a cross-section through a composite glass pane laminated with the multilayer film according to the invention of FIGS. 1a and 1b, FIG. 3a cross-section through the multilayer film with electrically switchable optical properties during the method according to the invention, FIG. 4 another cross-section through the multilayer film with electrically switchable optical properties during the method according to the invention, FIG. 5 different processing stages of the multilayer film with electrically switchable optical properties during the method according to the invention, and FIG. 6 an exemplary embodiment of the method according to the invention referring to a flowchart.

FIG. 1a depicts a plan view of a multilayer film (1) with electrically switchable optical properties. FIG. 1b depicts a cross-section of the multilayer film (1) of FIG. 1a along the section line A-A. The multilayer film (1) is an SPD functional element. The multilayer film (1) comprises a first carrier film (5), a first electrically conductive layer (3), an active layer (2), a second electrically conductive layer (4), and a second carrier film (6), which are arranged sheet-wise one on top of the other in the order indicated. The first carrier film (5) and the second carrier film (6) are made of polyethylene terephthalate (PET) and have a thickness of 0.125 mm. The first electrically conductive layer (3) and the second electrically conductive layer (4) are made of indium tin oxide (ITO) and have a thickness of, for example, roughly 50 nm. The active layer (2) contains polarized particles suspended in a resin. As a function of a voltage applied to the electrically conductive layers (3, 4), the suspended particles orient themselves along a common spatial direction. Through the orientation of the particles, the absorption of visible light is reduced. Consequently, the transmission of visible light through the multilayer film (1) can be conveniently controlled electrically. In the first electrically conductive layer (3) and the second electrically conductive layer (4), two congruently arranged circumferential separating lines (16) that separate an insulated edge region (18) of the multilayer film (1) are introduced. The electrically conductive layers (3, 4) within this insulated edge region (18) are not electrically conductively connected to the remaining area of the electrically conductive layers (3, 4). The width of the separating lines (16) is 200 µm. A sealed region (7) is produced in one part of the insulated edge region (18), in that the first carrier film (5) and the second carrier film (6) are welded to each other and thus seal the edge of the multilayer film (1). The sealed region has a width of 2 mm. The sealing according to the invention is particularly advantageous since it can be realized regardless of the dimensions and edge geometries of the multilayer film (1), is visually inconspicuous, and has proven itself to be particularly resistant to aging. This was surprising and unexpected for the person skilled in the art.

Figure 2:
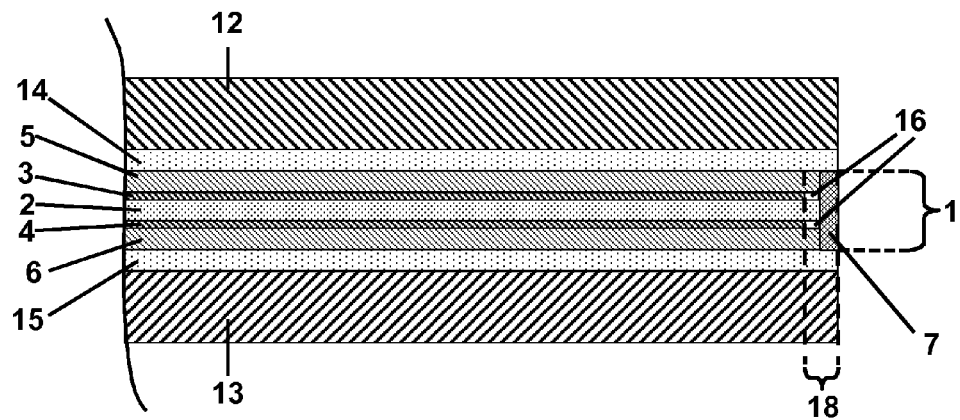

FIG. 2 depicts a cross-section through a composite glass pane laminated with the multilayer film according to the invention (1) of FIGS. 1a and 1b. The multilayer film (1) is placed between a first laminating film (14) and a second laminating film (15). The multilayer film (1) is bonded via the first laminating film (14) to the first pane (12) and via the second laminating film (15) to the second pane (13). The laminating films (14, 15) are made, for example, of ethylene vinyl acetate (EVA) and have in each case a thickness of 0.38 mm. The panes (12, 13) are made, for example, of soda lime glass and have thicknesses of, for example, roughly 2 mm. Through the embedding of the multilayer film (1) in the intermediate layer of the composite pane, a composite pane with electrically switchable optical properties can be produced in a simple manner. The bonding of the individual layers to form the composite pane is done using conventional methods under the action of temperature, pressure, and/or vacuum, with the multilayer film (1) being embedded between the laminating films (14, 15).

FIG. 3 depicts a cross-section through the multilayer film (1) of FIGS. 1a and 1b during the method according to the invention. With the method according to the invention, at least one separating line (16) is introduced into the electrically conductive layers (3, 4) of the multilayer film (1). FIG. 3 depicts the processing of the first electrically conductive layer (3). The radiation (9.1) of a first laser (8.1) is focused by means of an f-theta lens as the focusing element (10) through the carrier film (5) onto the first electrically conductive layer (3). By means of a movable mirror (11), the radiation (9.1) can be moved over the first electrically conductive layer (3). Preferably, the radiation (9.1) is guided parallel to the edge of the multilayer film (1) at a constant distance therefrom. The movement of the radiation (9.1) results in laser-induced degeneration of the first electrically conductive layer (3). By this means, a separating line (16) is created within the first electrically conductive layer (3). The separating line (16) is an electrically nonconductive, linear region within the first electrically conductive layer (3), which extends over the entire thickness of the first electrically conductive layer (3). The separating line (16) is advantageously selectively introduced into the electrically conductive layer (3). In particular, the first carrier film (5) is not damaged during the introduction of the separating line (16).

FIG. 4 depicts another cross-section through the multilayer film (1) of FIGS. 1a and 1b during the process according to the invention. After introduction of two congruent separating lines (16) into the first electrically conductive layer (3) and the second electrically conductive layer (4) in accordance with the method described in FIG. 3, as depicted in FIG. 4, a sealed region (7) is created. The radiation (9.2) of the second laser (8.2) is focused via a lens used as a focusing element (10) and a diffraction grating (17) as a continuous laser line onto the first carrier film (5) and the second carrier film (6) and moved over the multilayer film (1) within the insulated edge region (16). The carrier films (5, 6) are warmed by this and welded to each other such that a sealed region (7) is formed. To ensure better adhesion of the carrier films (5, 6) to each other, the heated carrier films (5, 6) then run through a pair of rollers consisting of two opposing rollers that press the carrier films (5, 6) together (not shown). The welding of the carrier films (5, 6) in the edge region according to the invention is particularly advantageous, since particularly good tightness is ensured that effectively prevents leakage of material out of the active layer. In addition, the radiation (9.2) of the second laser (8.2) can be guided precisely along any edge geometry of the multilayer film (1) such that even complex film geometries can be processed simply and with automation.

FIG. 5 depicts various processing stages of the multilayer film (1) with electrically switchable optical properties of FIGS. 1a and 1b during the method according to the invention. The multilayer film (1) provided (FIG. 5, step I) is first subjected to the laser process described in in FIG. 3. First, a circumferential separating line (16) is introduced using the first laser (8.1) through the first carrier film (5) into the first electrically conductive layer (3) (FIG. 5, step II). Then, using the first laser (8.1) through the first carrier film (5), another circumferential separating line (16) is introduced into the second electrically conductive layer (4) (FIG. 5, step III). In the insulated edge region (18) created, welding of the carrier films (5, 6) to form a sealed region (7) (FIG. 5, step IV) occurs using the laser method described in FIG. 4.

FIG. 6 depicts an exemplary embodiment of the method according to the invention for producing a multilayer film (1) with electrically switchable optical properties and a sealed region (7) according to the invention.

LIST OF REFERENCE CHARACTERS 1 multilayer film with electrically switchable optical properties
2 active layer of the multilayer film (1)
3 first electrically conductive layer of the multilayer film (1)
4 second electrically conductive layer of the multilayer film (1)
5 first carrier film of the multilayer film (1)
6 second carrier film of the multilayer film (1)
7 sealed region of the multilayer film (1)
8.1 first laser
8.2 second laser
9.1 radiation of the first laser (8.1)
9.2 radiation of the second laser (8.2)
10 focusing element
11 adjustable mirror
12 first pane
13 second pane
14 first laminating film
15 second laminating film
16 circumferential separating lines
17 diffraction grating
18 insulated edge region of the multilayer film (1)
A-A' section line

The invention claimed is:

1. A multilayer film with electrically switchable optical properties, comprising, arranged sheet-wise in order, at least:
   a first carrier film,
   a first electrically conductive layer,
   an active layer comprising liquid crystals,
   a second electrically conductive layer, and
   a second carrier film,
wherein
   an edge region of the first carrier film is joined to an edge region of the second carrier film to form an insulated edge region,
   the multilayer film includes a first circumferential separating line forming a first non-electrically conductive region bounded on one side by the first electrically conductive layer and on an opposite side by the insulated edge region,
   the multilayer film includes a second circumferential separating line forming a second non-electrically conductive region bounded on one side by the second electrically conductive layer and on an opposite side by the insulated edge region, and
   the first circumferential separating line is separated from the second circumferential separating line by the active layer.

2. The multilayer film according to claim 1, wherein the at least two circumferential separating lines are introduced with a first laser through at least one of the first carrier film and the second carrier film into the first electrically conductive layer and the second electrically conductive layer and have a width of 10 μm to 500 μm.

3. The multilayer film according to claim 1, wherein the first carrier film and the second carrier film are welded by heating at least one of the first carrier film and the second carrier film in at least a part of the insulated edge region by means of a second laser to form a sealed region.

4. The multilayer film according to claim 3, wherein a width of the sealed region is 500 μm to 1 cm.

5. The multilayer film according to claim 1, wherein at least one of the first carrier film and the second carrier film contain at least one thermoplastic polymer.

6. The multilayer film according to claim 1, wherein the first electrically conductive layer and the second electrically conductive layer contain at least one of a metal, a metal alloy, and a transparent conducting oxide.

7. The multilayer film according to claim 1, wherein the active layer comprising liquid crystals is a polymer dispersed liquid crystal (PDLC).

8. A composite pane with a multilayer film according to claim 1, wherein the multilayer film is arranged between at least one first pane and one second pane.

9. A method for producing a multilayer film with electrically switchable optical properties, the method comprising:
   directing radiation of a first laser through at least one of a first carrier film and a second carrier film and onto at least one of a first electrically conductive layer and a second electrically conductive layer, wherein the first carrier film and the second carrier film are part of a multilayer structure that includes, in the following order, the first carrier film, the first electrically conductive layer, an active layer comprising liquid crystals, the second electrically conductive layer, and the second carrier film,
   moving radiation of the first laser over the at least one of the first electrically conductive layer and the second electrically conductive layer, thereby creating at least one circumferential separating line,
   sealing the first carrier film and the second carrier film to form an insulated edge region, wherein the insulated edge region includes a sealed region bounding the first electrically conductive layer, the active layer, and the second electrically conductive layer, and wherein the at least one circumferential separating line forms a non-electrically conductive region bounded on one side by one of the first electrically conductive layer and the second electrically conductive layer and on an opposite side by the sealed region.

10. The method according to claim 9, wherein sealing the first carrier film and the second carrier film comprises welding the first carrier film and the second carrier film together by means of radiation of a second laser.

11. The method according to claim 9, wherein the first electrically conductive layer and the second electrically conductive layer have, at a wavelength of the radiation of the first laser, an absorption greater than or equal to 0.1%, wherein the first carrier film and the second carrier film have, at the wavelength of the radiation, an absorption less than or equal to 15%, and wherein a ratio of an absorption of the first and second electrically conductive layers to the absorption of the first and second carrier layers, at the wavelength of the radiation is greater than or equal to 0.5.

12. The method according to claim 11, wherein the wavelength of the radiation of the first laser when creating the at least one circumferential separating line is from 150 nm to 1200 nm.

13. The method according to claim 9, wherein moving the radiation of the first laser comprises moving the radiation at a speed of 100 mm/s to 10000 mm/s.

14. The method according to claim 9, wherein the first laser is operated in pulse mode having pulse lengths less than or equal to 50 ns and a pulse repetition frequency from 1 kHz to 200 kHz.

15. The method of claim 9, wherein the first carrier film and the second carrier film are sealed together in the insulated edge region, forming a sealing region bounding the first electrically conductive layer, the active layer, and the second electrically conductive layer, and wherein at least two circumferential separating lines separate the first electrically conductive layer and the second electrically conductive layer from the sealed region, including a first circumferential separating line forming a non-electrically conductive region bounded on one side by the first electrically conductive layer and on an opposite side by the sealed region, and a second circumferential separating line forming a non-electrically conductive region bounded on one side by the second electrically conductive layer and on an opposite side by the sealed region.

16. The multilayer film of claim 1, wherein the at least two circumferential separating lines each have a width of 10 μm to 500 μm.

17. The multilayer film of claim 1, wherein the first carrier film and the second carrier film are each glass panes.

18. The method of claim 9, wherein the first carrier film and the second carrier film are each glass panes.

* * * * *